United States Patent [19]
Jamieson et al.

[11] Patent Number: 5,338,928
[45] Date of Patent: Aug. 16, 1994

[54] SYSTEM AND METHOD FOR CONTROLLING DEFORMATION OF A STRUCTURE HAVING A PHASE SHIFT DETECTOR

[75] Inventors: James R. Jamieson, Maineville; Ahmad P. Zahedi, Cincinnati; Heidi J. Stegemiller, Franklin, all of Ohio

[73] Assignee: General Electric Company, Cincinnati, Ohio

[21] Appl. No.: 55,169

[22] Filed: Apr. 28, 1993

[51] Int. Cl.⁵ ............................................. H01J 40/14
[52] U.S. Cl. ........................ 250/227.21; 250/227.19; 73/800
[58] Field of Search ................. 250/227.21, 227.27, 250/227.14, 227.19, 227.15; 73/705, 800, 517 R, 657, 556; 385/13, 3, 12

[56] References Cited
U.S. PATENT DOCUMENTS

| | | |
|---|---|---|
| H371 | 11/1987 | Bobb . |
| 4,781,056 | 11/1988 | Noel et al. ..................... 250/227.14 |
| 4,900,919 | 2/1990 | Twerdochlib .................. 250/227.27 |
| 4,922,096 | 5/1990 | Breunan ......................... 250/227.14 |
| 4,942,767 | 7/1990 | Haritonidis et al. . |
| 5,009,505 | 4/1991 | Malvern . |

OTHER PUBLICATIONS

"Fiber Optic Sensor Technology-An Opportunity for Smart Aerospace Structures" by J. S. Heyman and R. S. Rogowski, NANA Langley Research Center, Hampton, Va. and R. O. Claus, Virginia Polytechnic Institute and State University, Blacksburg, Va. dated Sep. 7–9, 1988, AIAA/NASA/AFWAL Conference on Sensors and Measurements, Techniques for Aeronautical Applications, 6 pages.

"Piezoelectric Actuators for Distributed Vibration Excitation of Thin Plates" by E. K. Dimitriadis, C. R. Fuller and C. A. Rogers, vol. 113, Jan. 1991, Journal of Vibration and Acoustics, pp. 100–107.

Primary Examiner—David C. Nelms
Assistant Examiner—Que T. Le
Attorney, Agent, or Firm—Jerome C. Squillaro; Nathan D. Herkamp

[57] ABSTRACT

Vibrations within ceramic matrix and metal matrix composite materials are controlled by applying an excitation voltage to an array of piezoelectric actuators mounted to the surface of such materials. The actuators are driven in response to the phase shift of monochromatic light transmitted through a grid of optical fibers embedded within the composite materials. Applications include active vibration suppression, de-icing, and on-line structural integrity monitoring.

20 Claims, 5 Drawing Sheets

SYSTEM AND METHOD FOR CONTROLLING DEFORMATION OF A STRUCTURE HAVING A PHASE SHIFT DETECTOR

BACKGROUND OF THE INVENTION

Field of the Invention

The present invention relates in general to aircraft structures fabricated of ceramic matrix composite materials and metal matrix composite materials which include fiber optic sensors for transmitting data within the structure. The invention particularly concerns advanced high temperature aircraft exhaust materials with optimized modal characteristics for minimum vibrational excitation and extended service life.

Description of Prior Developments

The necessity for fiber optic integrated aircraft structures stems from the extreme environments under which materials such as ceramic matrix composite (CMC) materials and metal matrix composite (MMC) materials must perform. Such environments include temperatures in excess of 1800° F., with separated, unsteady aerodynamic loads, high g maneuver loads, and thrust vectoring loads, to name a few. Fiber optic integrated smart structures can monitor in-flight, real-time data regarding the structural integrity of these materials so as to avoid costly and time consuming inspections.

At this point in time, failure prediction and inspection criteria development lag behind the material development of CMC and MMC materials. It should not be assumed that field applications of such materials will undergo rigorous, nondestructive testing to ensure structural integrity on the flight line. Moreover, testing of CMC and MMC components before they are placed in service can reduce the initial investment in such components.

Several advanced military aircraft applications are now using fiber reinforced ceramic matrix and metal matrix composites for high temperature engine environments. These materials are being developed to further reduce engine weight, increase exhaust temperatures, and improve high temperature strength capability.

Since these materials have directional strength characteristics, they also are prone to damage which, from the surface, may not be detected by visual inspection. The detection of internal delaminations or microcracking in either composite system commonly requires costly, time-consuming non-destructive testing and inspections. Therefore, a system is needed which can monitor, predict, identify, alleviate, and control fatigue damage while the CMC and MMC components are in service.

Advanced high temperature structures fabricated with CMC or MMC are commonly composed of a fiber reinforced system which may include a braided fiber architecture, a conventional lay-up, or a woven structure. Once the fiber architecture is established, an optical fiber capable of high temperature environments can be inserted into the structure prior to chemical vapor infiltration, as in the case of CMC's, or prior to plasma spraying, foil-fiber-foil construction, or other assembly methods as in the case of MMC's.

Once the optical fibers are inserted and the structure completes densification, consolidation or MMC final processing, a structure is produced which contains both optical fibers and structural fibers. The structural fibers, such as silicon carbide fibers, provide strength and fracture toughness. The set of optical fibers forms an optical network within the surrounding associated matrix.

By connecting a monochromatic light source such as a laser to one end of an optical fiber and recording phase shifts in the reflection coefficients at the other end of the optical fiber, a correlation can be established between a stress-free condition and other conditions. In this manner, loadings, thermal gradients, and residual stresses can be instantaneously determined.

The optical fiber responds to such external loadings and inputs to the CMC or MMC structure since the optical fiber is integral with the composite system. The embedded optical fiber undergoes virtually the same deformation, expansion, and contraction as the composite material. This deformation changes the cross-sectional area of the optical fiber and, as the cross-sectional area changes, the angle at which the monochromatic light source propagates in the fiber optic line changes.

The change in incident angles across the length of the optical fiber results in a frequency domain phase shift. This phase shift can be correlated to input loadings on the structure. Over the life of the composite material, the structure can be monitored real-time to assess numerous conditions within the material. For example, it is possible to determine what permanent set, if any, has occurred. The existence of microcracking, delaminations, and erosion as well as oxidation can also be determined. This data can be related back to fatigue life, therefore resulting in a real-time assessment of component life as well as damage assessment.

Although this information is quite useful in determining the need for maintenance and repair of the CMC or MMC structures, an even greater advantage could be realized if this data could be used to prevent wear and damage to such structures.

SUMMARY OF THE INVENTION

The present invention is directed to the application of piezoelectric (PE) actuators to fiber optic integrated materials, such as CMC or MMC materials, for reducing or eliminating the adverse affects of fatigue loads, particularly in jet aircraft applications. A typical PE actuator is composed of a ceramic-based material which responds to voltages applied along its direction of polarization in the form of strains normal to such polarization.

For example, a given PE material may have a polarization across its thickness direction. When voltage is applied across the thickness, strains develop in the plane of the material transverse to the polarization. By mounting a PE actuator onto the surface of a CMC or MMC structure, the PE actuator can induce localized bending moments into the structure.

By combining PE actuation technology with fiber optic integrated CMC or MMC materials, such materials can be actively self-controlling with regard to vibration induced deflections. Displacement data monitored by fiber optic sensors, such as gold-coated silica fibers or sapphire fibers, is fed back into a compensating control law so as to actively dampen vibration induced amplitudes within the material. Such active sensing and compensation allows extremely fast, real-time responses to vibration inputs. Response can take place in the order of a nanosecond.

Actively controlled structures within a severe, high temperature environment provide a decisive advantage in the development and implementation of CMC and MMC materials within a fully integrated, independently controlled, advanced material system. Such a system integrates valuable data regarding fatigue life with compensating measures aimed at reduced alternating strains. This system combines fault detection with active vibration control, trouble shoots material development, and provides real-time structural integrity assurance. This, in turn, allows further development and application of CMC's and MMC's into existing and future jet aircraft applications and leads to increased thrust-to-weight ratios, and improved mission capability and flight readiness.

The present invention also allows the use of CMC or MMC components in high temperature engine environments without the need for costly or time-consuming, nondestructive inspections. CMC or MMC components with embedded optical fibers can be utilized in difficult to reach, non-accessible locations allowing structural integrity to be monitored in real-time.

The present invention also provides the capability to monitor residual manufacturing stresses which are extremely difficult to determine using conventional technologies. These stresses can be monitored not only before and after processing, but during the life of the part as well. Structural integrity information can be provided to one or more on-board flight computers to assess that portion of the total flight system structural integrity, safety of flight confidence levels, probabilities of in-flight failures, and mission safety.

In addition to providing structural assessments, high temperature smart structures can also serve as an optical bus for transmitting data throughout the aircraft engine, thereby eliminating the need for control system wiring, instrumentation, etc. The optical fibers can provide increased speed in collecting data due to their higher wave propagation speeds and decreased signal attenuation as compared to conventional wire conductors. This system, if fully utilized, can result in a substantial decrease in engine weight, improved engine performance characteristics, increased flight and mission readiness and reduced electromagnetic interference (EMI).

EMI reductions are important for proper electronic system interfacing, particularly on military platforms employing radar evasion technologies. The use of fiber optics to replace conventional electrical wires reduces the magnetic wave propagation of a weapon platform and therefore reduces the radar cross section and hence, reduces detectability. Fiber optics also reduces EMI with on-board computers.

Alternatives to this technology can be found in the use of particulate reinforced high temperature ceramics and melt infiltration processes.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DETAILED DESCRIPTION OF THE PREFERRED EMBODIMENTS

The present invention will now be described in conjunction with the drawings, beginning with FIGS. 1 and 2 which show a composite material 10, such as a CMC or MMC material, within which is embedded a plurality of optical fibers 12. Material 10 typically is formed of numerous silicon carbide fibers while the optical fibers 12 may take the form of sapphire or silica fibers. As seen in FIG. 2, each optical fiber 12 is clad with an inert cladding 14, such as gold or iridium.

Figure 1:
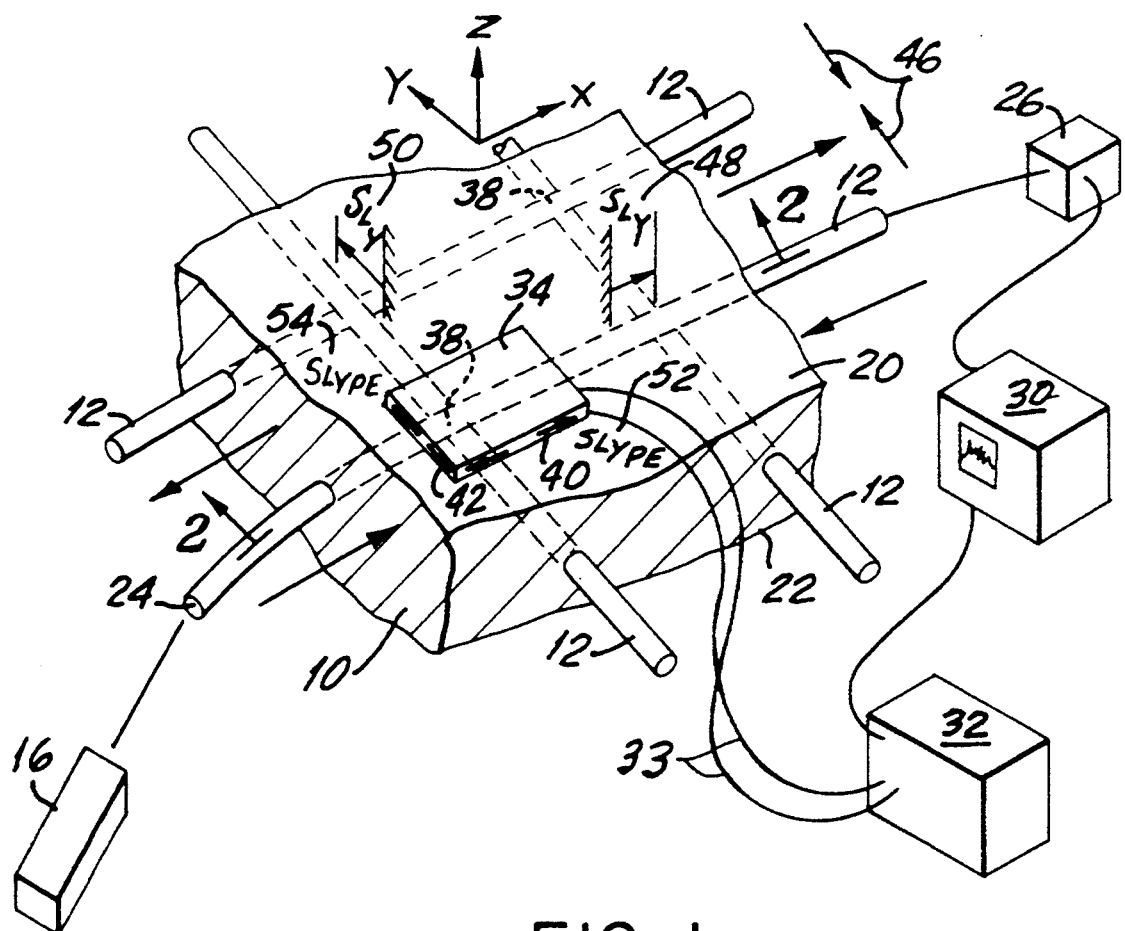
FIG. 1 is a partial schematic perspective view of a high temperature composite material integrated with fiber optic sensors and piezoelectric actuators for controlling fatigue cycles.
Figure 2:
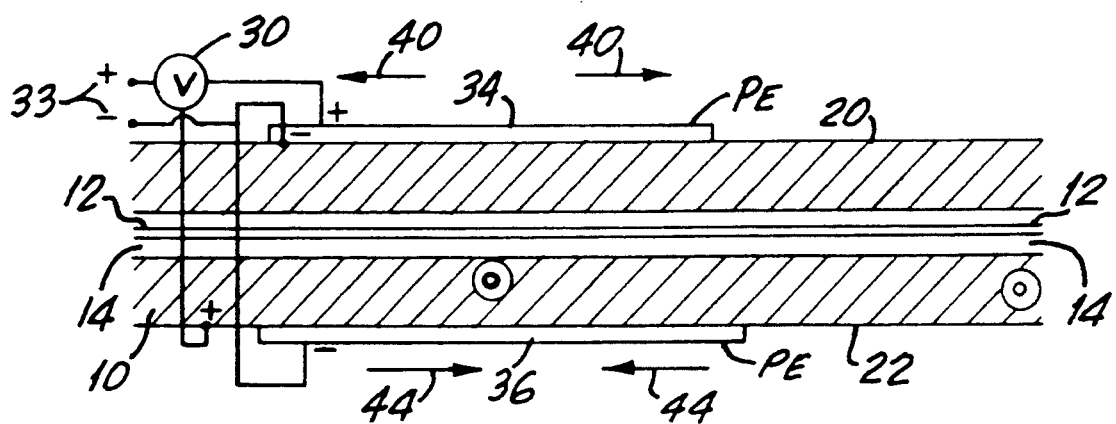
FIG. 2 is a sectional view taken through line 2—2 of FIG. 1.

The optical fibers 12 may be arranged in an orthogonal network or grid pattern for detecting mechanical deformation along the mutually perpendicular axes X and Y as seen in FIG. 1. Strain or deformation along the X axis is detected by the optical fibers 12 which extend longitudinally along the X axis, and strain or deformation along the Y axis is detected by the optical fibers 12 which extend longitudinally along the Y axis. Dispersion of optical fibers along the Z axis provides strain information on bending loads and bending moments.

The optical network formed by the optical fibers is self-supporting and integral to the material 10. That is, in a typical high temperature CMC or MMC material modified in accordance with the present invention, a few silicon carbide fibers from the CMC or MMC are replaced with each optical fiber 12. The network optical fibers extends through the material 10, between its opposed outer surfaces 20, 22.

A source of monochromatic light 16, such as provided by a laser or laser diode, is directed into one end 24 of each optical fiber 12 for providing displacement data to an optical phase shift detector 26 to which the other end 28 of each optical fiber is connected. The degree of displacement, deformation or strain experienced by the material 10 is correlated to the degree of the phase shift in the light reaching the phase shift detector 26. This phase shift may be monitored by oscilloscope 30.

This optical phase shift information is sent to a control system which transforms this information into a control signal in accordance with an algorithm or control law. The control signal is then sent to a control system voltage source 32 which generates an excitation voltage 33 and phase shift corresponding to the control signal. The phase shift may be 180 to counteract any undesired deformation.

The excitation voltage is then applied to one or more PE actuators 34, 36 which are mounted, such as by adhesive bonding, to the outer surfaces 20, 22 of the material 10. The PE actuators may be constructed in virtually any desired shape, such as a strip or a patch configuration. As seen in FIG. 2, an upper PE actuator 34 is mounted on upper surface 20 directly opposite a lower PE actuator 36 mounted on lower surface 22. Each of the PE actuators is preferably of equal size so as to simplify their control function.

Each upper and lower PE actuator is aligned with or mounted in the vicinity of a specific optical fiber 12 and, in particular, centered over the points 38 where each pair of optical fibers overlap. In this manner, the array of PE actuators forms a network or grid which matches or corresponds to the network or grid defined by the optical fibers.

As further seen in FIG. 2, for damping a vibration along the Z axis, i.e., a bending type of vibration out of the plane of the material 10, the excitation voltage 33 is applied to each opposed pair of PE actuators such that each PE actuator 34 is oppositely polarized with respect to its opposite coacting PE actuator 36. Thus, the excitation voltage 33 in FIG. 2 will cause the upper PE actuator 34 to expand along directional arrows 40, 42 and cause the lower PE actuator 36 to contract along directional arrows 44, 46. This will cause the material 10 shown in FIG. 2 to arch or dome upwardly as represented in phantom. By reversing the polarity of the excitation voltage 33, the material 10 would deform in the opposite direction, i.e. arch or dome downwardly.

Figure 3:
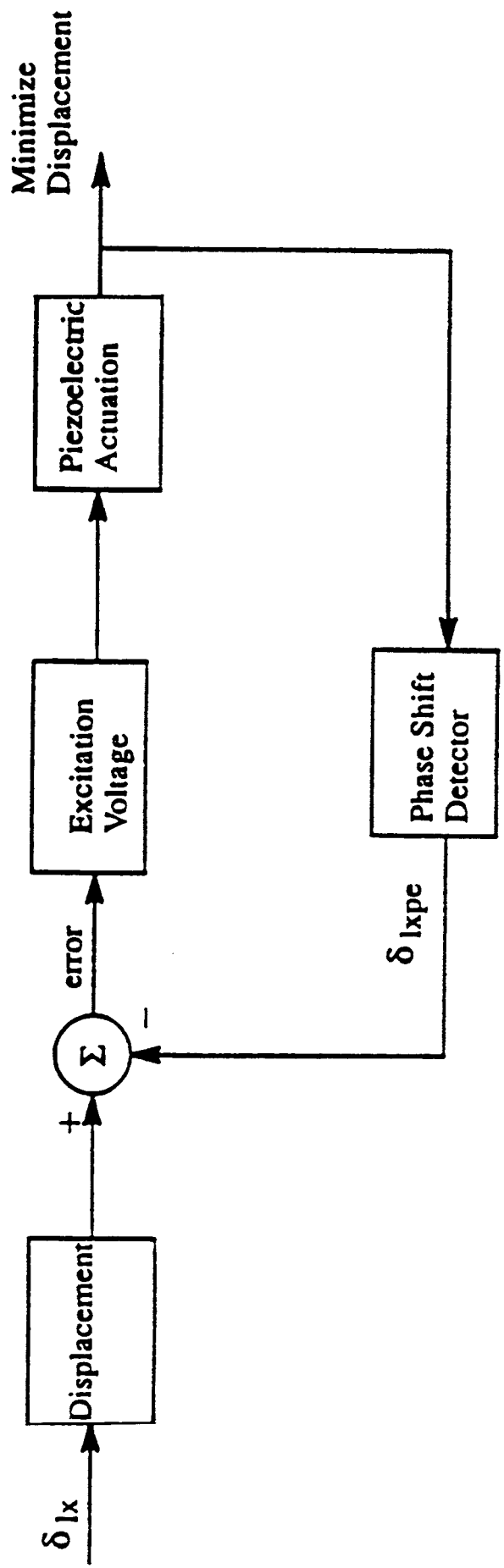
FIG. 3 is a schematic algorithm or control law for a control system for reducing bending of the material of FIG. 1.

The application and polarity of the excitation voltage may be determined by a control law such as that represented in FIG. 3. Any deflections in material 10 may be actively damped or diminished based on an error signal corresponding to the monitored displacements of material 10 minus the input actuations provided by the PE actuators. The control law represented in FIG. 3 minimizes the error signal.

For in-plane axial and shear damping or excitation of material 10 along its X-Y plane, the PE actuators 34, 36 are driven with voltages of like polarity. This produces in-plane, opposing or damping forces.

Conventional electronic hardware is available to process and maintain the control law so that displacement in material 10 caused by external loading is counteracted by an approximately equal but oppositely directed loading generated by the PE actuators. In this manner, the deformation of material 10 may be reduced or minimized so as to prevent material failure due to vibration and fatigue. A simple representation of one example of minimizing vibration maintains the algebraic sum of the individual deformations 48, 50 (FIG. 1) induced by external loading in each of the X and Y directions in FIG. 3 equal and opposite to those 52, 54 provided by the PE actuators.

Figure 4:
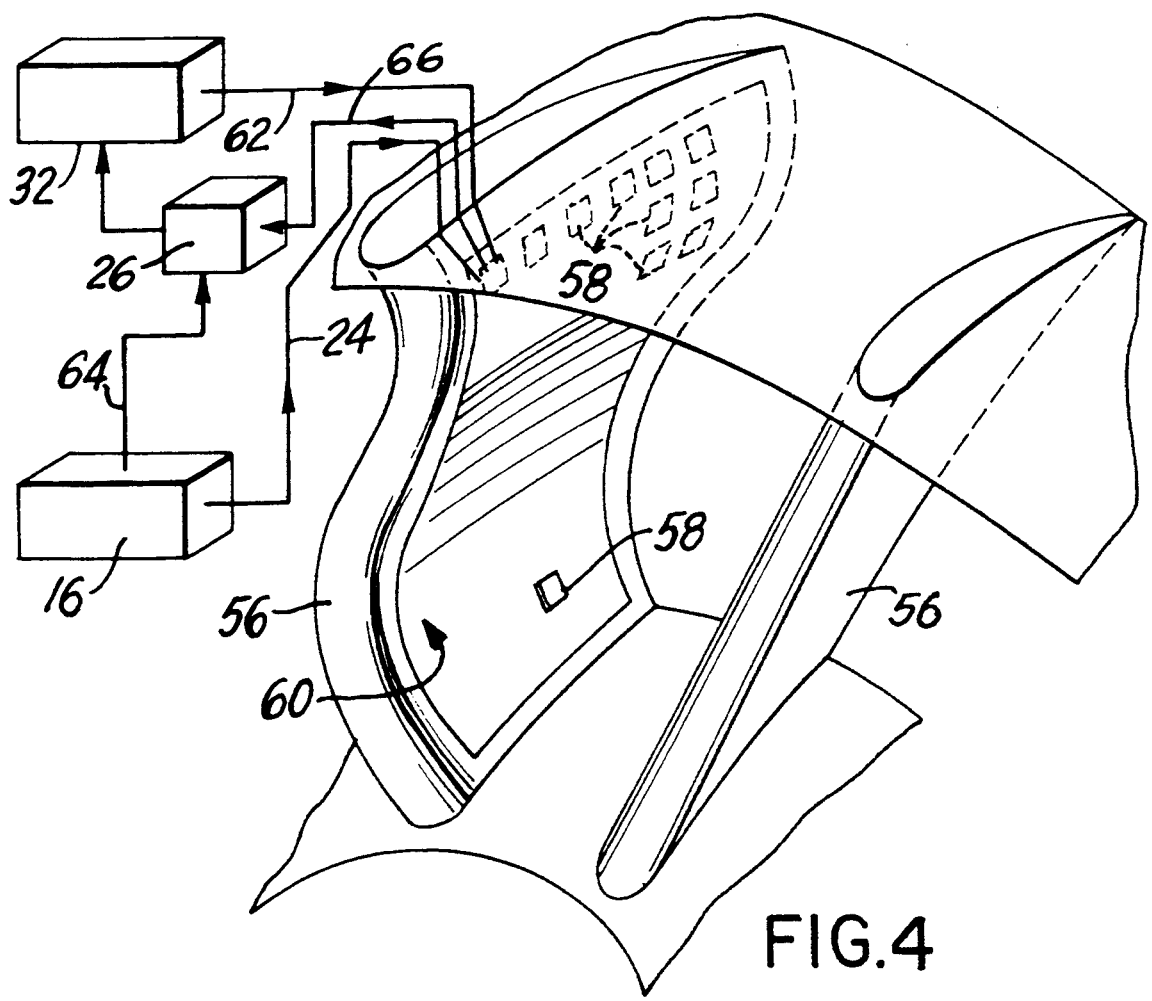
FIGS. 4-4A are schematics representation of one form of the invention applied to an aircraft turbine vane to prevent vane deformation due to vibrational frequencies.
Figure 4A:
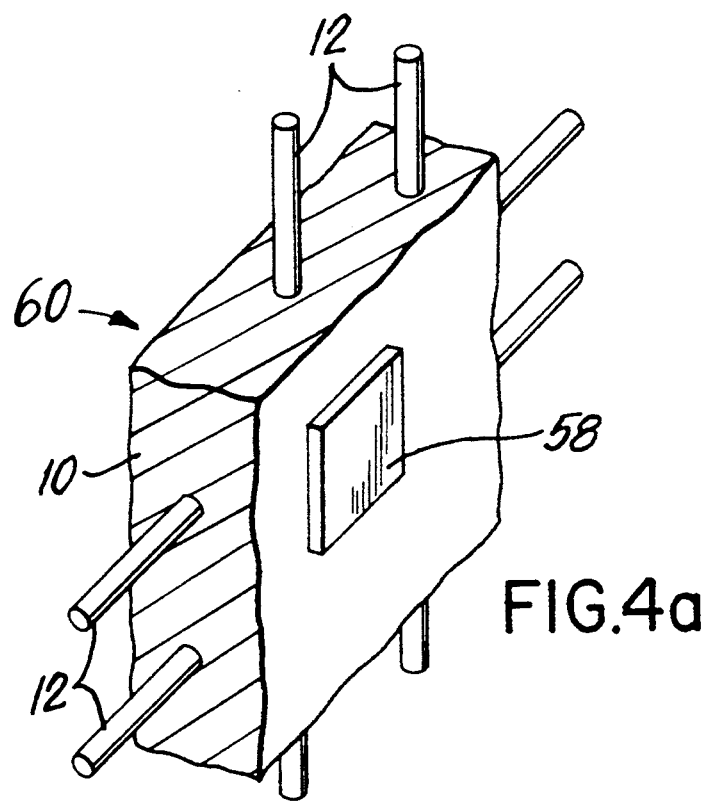

Alternate forms of this invention include modified control laws and possibly different materials. In addition, a "patch" in the form of a fiber optic integrated PE actuator could be applied to current problem areas in the field. If, for example, as shown in FIG. 4, a turbine vane 56 in a jet engine developed a vibration problem, the PE patch 58 could be bonded to the vane surface. The patch would sense displacement amplitudes, provide compensating motions, and dampen out damaging vibration amplitudes to return the vane to its normal non-oscillating position represented by the adjacent vane 56 shown in FIG. 4.

An array of PE patches 58 could be applied in an ordered pattern to a strip or sheet 60 of CMC, MMC or other matrix material. Each PE patch 58 on strip 60 can receive a multiplexed voltage input 62 from voltage source 32. Voltage source 32 acts as a phase compensator which is controlled by the optical phase shift detector measures phase changes between the monochromatic light 64 received directly from laser diode 16 and the light 66 returning from the patches 58.

The patch can be made thin enough so as to not influence aerodynamic or performance characteristics yet provide a major contribution to alleviating in-production vibration problems, maintain aircraft readiness, and provide time until a design change could be enacted. Because the system would be, for the most part, independent of temperature, it could be applied to vectored nozzles and flowpath components as well.

Yet other applications of this technology include aircraft or engine de-icing systems which have polymeric composite leading edges, such as wing leading edges or engine inlet guide vanes. This technology could also be applied to rotocraft systems which require active suppression of rotor vibrations. PE actuators coupled with fiber optic sensors in the composite could actively sense and deform the structure based on changes in component stiffness, temperature, etc.

In an icing condition, as ice forms on the leading edge, PE actuators would be excited to introduce opposing localized bending moments which could be alternated over time to produce a surface which is in constant motion yet, to the eye, would appear only as small deflections. Based on the magnitude and relative deflections, ice particles would be shed from the surface before any significant weight or mass of ice accumulates.

Figure 7:
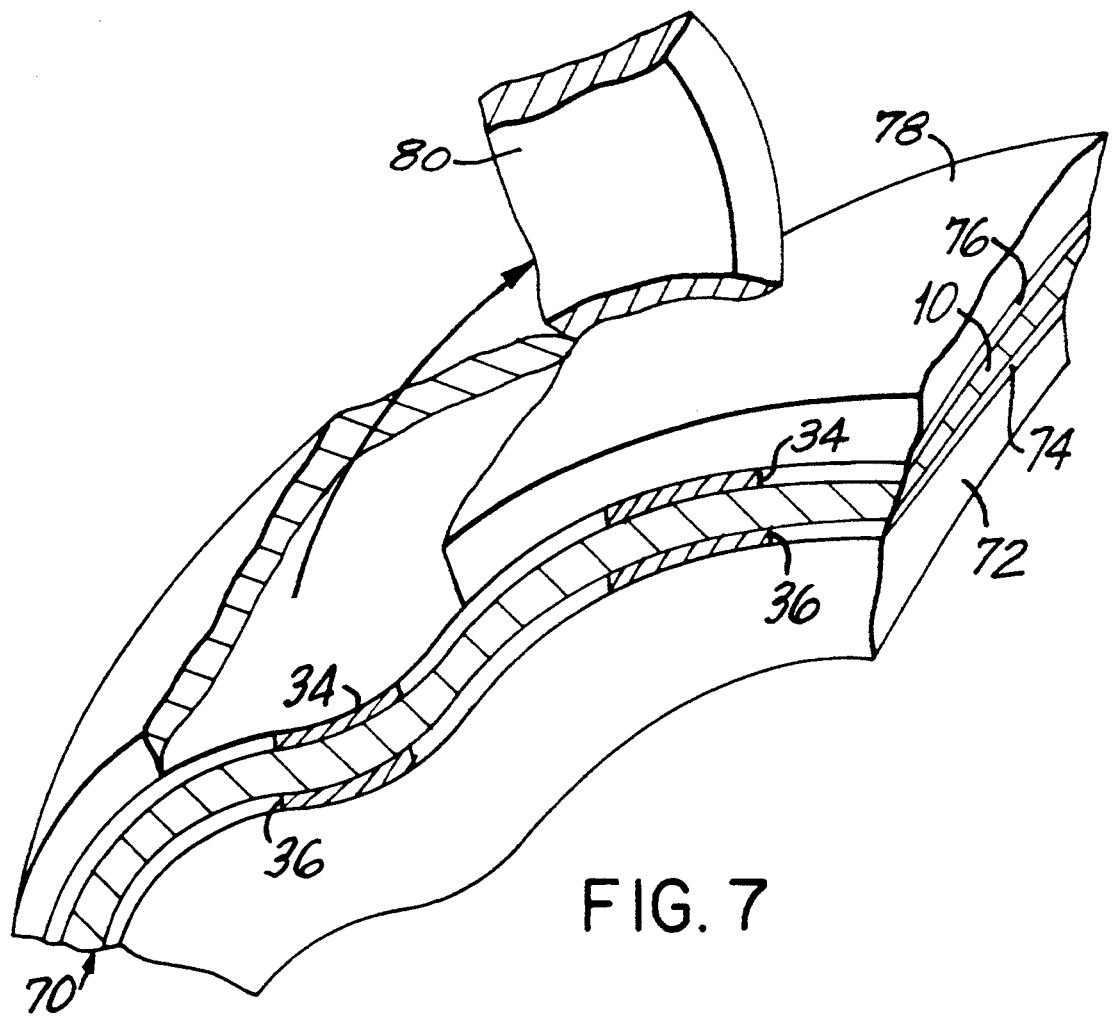
FIG. 7 is a view of the de-icing strip of FIG. 7 showing the de-icing action provided by the strip.
Figure 5:
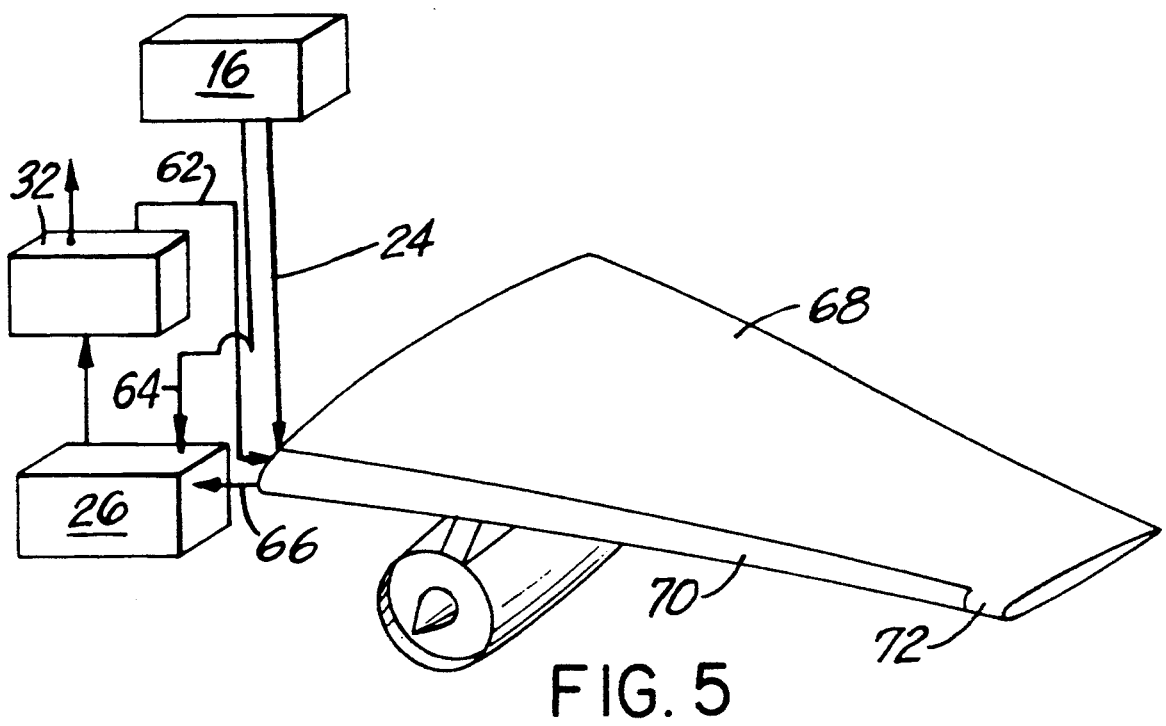
FIG. 5 is a schematic perspective view of an aircraft wing provided with a strip of piezoelectric actuators for de-icing the leading edge of the wing.
Figure 6:
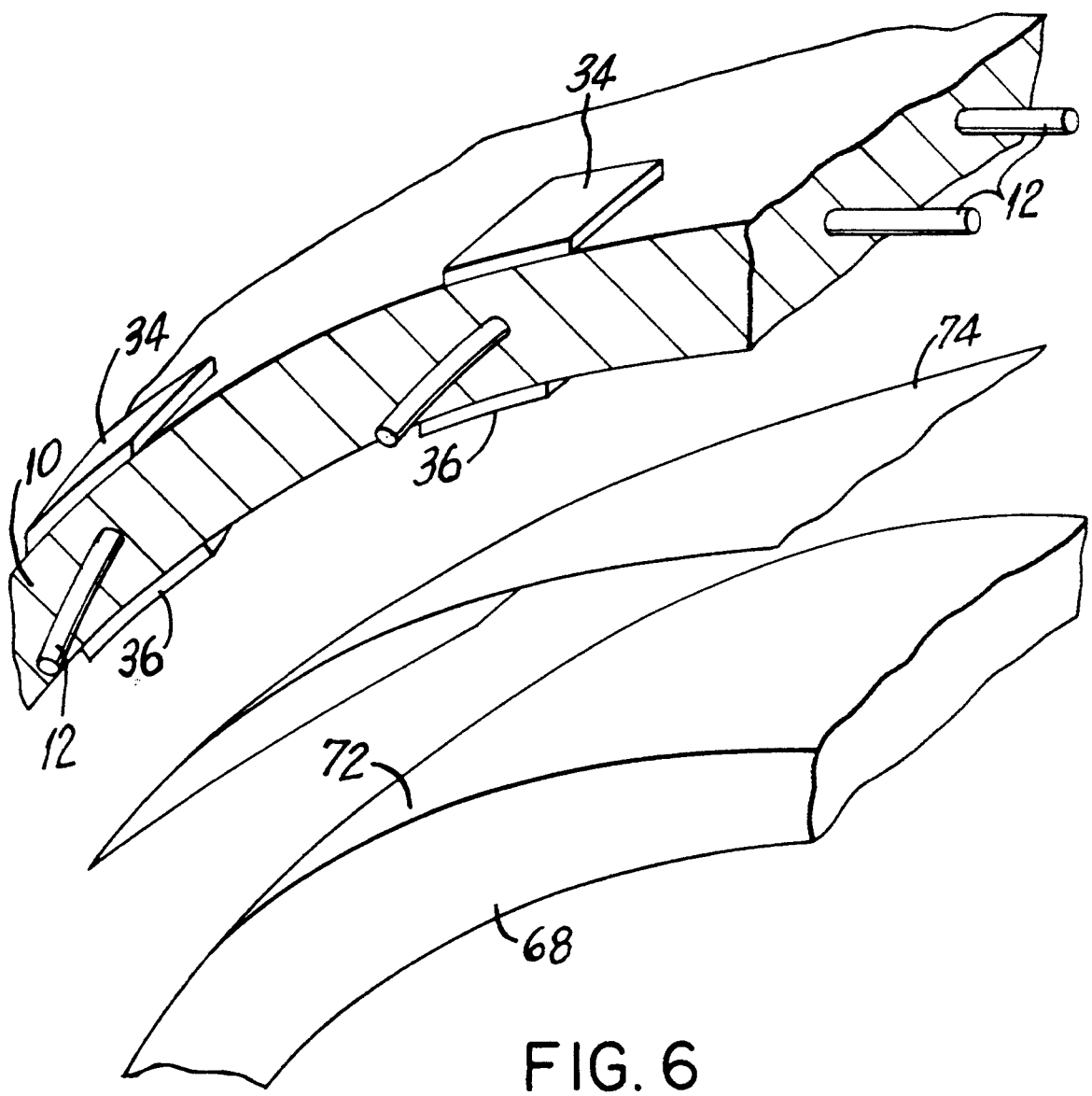
FIG. 6 is an enlarged exploded perspective view of a portion of the piezoelectric de-icing strip of FIG. 5.

An example of such de-icing system is shown in FIGS. 5, 6 and 7 wherein an aircraft wing 68 is provided with a strip 70 of piezoelectric actuators 34, 36 along the leading edge 72 of the wing 68. Strip 70 may be secured to wing 68 with a layer of bonding agent or adhesive 74, as shown in FIGS. 6 and 7 and then covered with a protective coating 76, as shown in FIG. 7. In the event a layer of ice 78 develops on the leading edge 72 of aircraft wing 68, as shown in FIG. 7, the piezoelectric strip 70 may be driven by multiplexed voltage inputs to the array of piezoelectric actuators 34, 36 arranged within the strip. Opposite piezoelectric actuators 34, 36 may be driven with opposite polarities, such as shown in FIG. 2 so as to produce localized bending moments which induce fracture of the weaker overlying ice layer 78. As seen in FIG. 7, small ice particles 80 are shed from the wing surface.

Obviously, numerous modifications and variations of the present invention are possible in the light of the above teachings. It is therefore to be understood that within the scope of the appended claims, the invention may be practiced otherwise than as specifically described herein. For example, piezoelectric patches 56 and piezoelectric strips 70 could be applied to the rotor of a helicopter in the same manner as that shown in FIGS. 4 and 5.

What is claimed is:

1. A system for controlling deformation of a structure, comprising:
   a composite material;
   a plurality of optical fibers embedded within said composite material;
   a light source connected to one end of each of said optical fibers;
   a light phase shift detector connected to an opposite end of each of said optical fibers;

a plurality of piezoelectric actuators connected to said material; and control means connected to said light phase shift detector and to said piezoelectric actuators for providing an excitation voltage to said piezoelectric actuators as a function of phase shift of light transmitted from said light source to said light phase shift detector.

2. The system of claim 1, wherein said control means further comprises an excitation voltage source connected to said piezoelectric actuators.

3. The system of claim 1, wherein said plurality of optical fibers is arranged in a grid pattern.

4. The system of claim 1, wherein said composite material comprises a ceramic matrix composite material.

5. The system of claim 1, wherein said composite material comprises a metal matrix composite material.

6. The system of claim 1, wherein said composite material comprises a pair of opposed surfaces and wherein said plurality of optical fibers is disposed between said opposed surfaces.

7. The system of claim 1, wherein said plurality of optical fibers comprises a plurality of structural fibers.

8. The system of claim 1, wherein said structural fibers are clad with an inert material.

9. The system of claim 1, wherein said piezoelectric actuators are respectively aligned in an array with said optical fibers.

10. The system of claim 1, wherein said composite material comprises a pair of opposed surfaces and wherein said piezoelectric actuators are mounted on each of said opposed surfaces.

11. The system of claim 10, wherein said control means comprises a source of excitation voltage connected to said piezoelectric actuators such that application of said excitation voltage to said piezoelectric actuators mounted on one of said opposed surfaces causes said piezoelectric actuators mounted thereon to expand, and application of said excitation voltage to said piezoelectric actuators mounted on the other one of said opposed surfaces causes said piezoelectric actuators mounted thereon to contract.

12. The system of claim 10, wherein said control means comprises a source of excitation voltage connected to said piezoelectric actuators, and wherein said source of excitation voltage applies voltages of like polarity to said piezoelectric actuators.

13. The system of claim 1, wherein said light sources comprises a monochromatic light source.

14. The system of claim 13, wherein said monochromatic light source comprises a laser light source.

15. The system of claim 14, wherein said laser light source comprises a laser diode.

16. The system of claim 1, wherein said structure comprises an aircraft engine component.

17. The system of claim 1, wherein said structure comprises an aircraft body surface.

18. The system of claim 17, wherein said aircraft body surface comprises an aircraft wing.

19. The system of claim 1, wherein said structure comprises a helicopter rotor.

20. A method of controlling deformations within a composite material, comprising:

attaching a piezoelectric actuator to said material;

embedding an optical fiber within said material;

transmitting light through said optical fiber to a detector; and applying an excitation voltage to said piezoelectric actuator as a function of said light detected by said detector.

* * * * *